United States Patent
Kagaya et al.

(10) Patent No.: US 6,567,362 B1
(45) Date of Patent: May 20, 2003

(54) OPTICAL DISK DEVICE HAVING GUIDE SHAFT FOR GUIDING OPTICAL PICKUP

(75) Inventors: Hiroyuki Kagaya, Miyagi-ken (JP); Takahiro Asano, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 447 days.

(21) Appl. No.: 09/641,038

(22) Filed: Aug. 16, 2000

(30) Foreign Application Priority Data

Sep. 28, 1999 (JP) .......................................... 11-274109

(51) Int. Cl.[7] .............................. G11B 7/08; G11B 7/22
(52) U.S. Cl. ...................................... 369/77.1; 369/219
(58) Field of Search ........................... 369/75.1, 77.1, 369/215, 219, 244, 249, 258, 263

(56) References Cited

U.S. PATENT DOCUMENTS

| | | | |
|---|---|---|---|
| 4,788,677 A | | 11/1988 | Ikedo et al. ................. 369/223 |
| 5,764,618 A | | 6/1998 | Kim |
| 5,768,248 A | | 6/1998 | Lee |
| 5,889,755 A | * | 3/1999 | Kim ........................... 369/219 |
| 5,933,408 A | | 8/1999 | Park et al. .................. 369/271 |
| 5,982,735 A | * | 11/1999 | Tsai ........................... 369/219 |
| 5,995,478 A | * | 11/1999 | Park ........................... 369/219 |
| 6,044,057 A | * | 3/2000 | Park et al. .................. 369/219 |
| 6,347,069 B1 | * | 2/2002 | Wakikawa et al. .......... 369/219 |

FOREIGN PATENT DOCUMENTS

| | | |
|---|---|---|
| EP | 03071478 | 3/1991 |
| JP | 08-22631 | * 1/1996 |

* cited by examiner

*Primary Examiner*—David L. Ometz
(74) *Attorney, Agent, or Firm*—Beyer Weaver & Thomas, LLP (57) ABSTRACT

There is provided an optical device in which a neutral position setting for each of the adjustment screws can be carried out easily and accurately while its workability is being superior and its cost is not being increased. There are arranged on a chassis formed by a sheet metal, a spindle motor on which a turntable for use in mounting an optical disk D is attached, an optical pickup, guide shafts for guiding the optical pickup in a radial direction of the optical disk D, the first and second supporting members and the third and fourth supporting members for supporting both ends of the guide shafts, and adjustment screws for moving a height position of one end of the guide shaft and the height positions of both ends of the guide shaft, and the chassis is provided with resin fixing members having fixing surfaces to attach and fix the spindle motor and resin reference members having reference planes within the same plane.

5 Claims, 6 Drawing Sheets

OPTICAL DISK DEVICE HAVING GUIDE SHAFT FOR GUIDING OPTICAL PICKUP

BACKGROUND OF THE INVENTION

1. Field of the Invention

This invention relates to an optical disk device in which an optical disk is loaded to perform either a recording operation or a reproducing operation.

2. Description of the Related Art

In an optical disk device, an optical disk is loaded and a laser beam is incident to an information recording surface of the optical disk to record information at the information recording surface or reproduce the recorded information.

Figure 6:
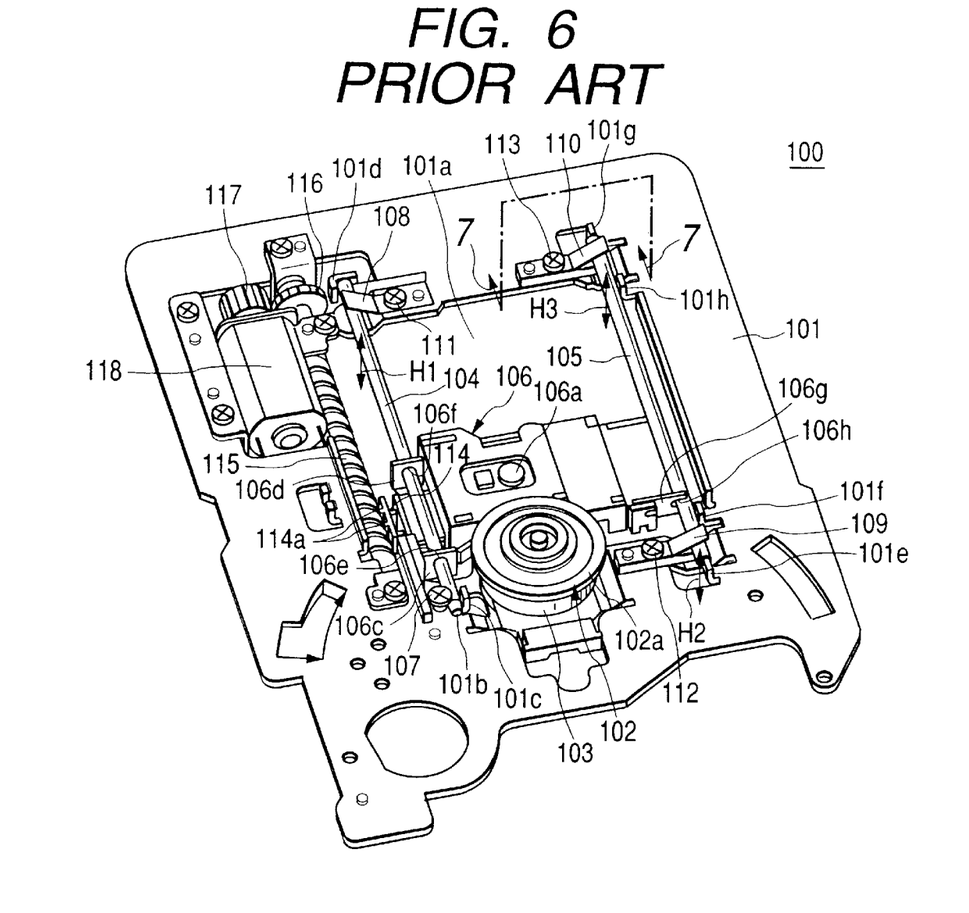
FIG. 6 is a perspective view for showing the prior art disk device.

FIG. 6 is a perspective view for showing a prior art optical disk device. The optical disk device 100 is mainly comprised of a substantial rectangular-shaped chassis 101 formed by a sheet metal and having partially a recess at its outer edge; a spindle motor 103 arranged on the chassis 101 and having a turntable 102 coaxially attached thereto; guide shafts 104, 105 arranged in parallel to each other; an optical pickup 106 having an objective lens 106a arranged between.the guide shafts 104, 105 and having a substantial rectangular outer shape; and a feeder mechanism to be described later for use in feeding the optical pickup 106 in a longitudinal direction of the guide shafts 104, 105.

Then, a constitution of the optical disk device 100 will be described in detail as follows.

At first, the central part of the chassis 101 is formed with a substantial rectangular-shaped hole 101a. Then, the spindle motor 103 is attached and fixed to the surface of the chassis 101 at one edge of the chassis 101 in a longitudinal, direction at the hole 101a. In addition, at both sides of the hole 101a in a lateral direction of the chassis 101 are arranged the guide shafts 104, 105 in such a way that they are in parallel to each other in the longitudinal direction and in parallel with the disk installing surface 102a of the turntable 102. One end of the guide shaft 104 at the side of the turntable 102 (hereinafter merely called as one end of the guide shaft 104) is positioned in a longitudinal direction and radial direction by the position setting pieces 101b and 101c formed while a part of the chassis 101 is protruded and bent, and one end of the guide shaft is attached and fixed to the chassis 101 with a screw 107. In addition, the other end of the guide shaft 104 (hereinafter similarly called as the other end of the guide shaft 104) is also similarly positioned by the position setting piece 101d, biased resiliently toward the surface of the chassis 101 by a leaf spring 108 fixed to the chassis 101 with a screw 111 and supported there. In turn, each of both ends of the guide shaft 105 is also similarly positioned by position setting pieces 101e, 101f and 101g, 101h and at the same time resiliently biased toward the surface of the chassis 101 by leaf springs 109, 110 fixed with screws 112, 113 and supported there.

Further, the guide shaft 104 is inserted into round holes. 106e, 106f formed at each of bent pieces 106c, 106d arranged at one end of the optical pickup 106 in its longitudinal direction, and a cutout groove 106h formed at the bent piece 106g arranged at the other end opposite to the round holes 106e, 106f is slidably supported at the guide shaft 105, thereby the optical pickup 106 is movably guided in a longitudinal direction (the radial direction of the optical disk) of the guide shafts, 104, 105 and further guided in such a way that a distance between the optical pickup 106 and the objective lens 106a and a distance between the objective lens 106a of the optical pickup 106 and the surface of the optical disk (not shown) is always kept at an approximate same distance.

Further, an attitude of the optical pickup 106 can be changed by a method wherein, in order to cause an optical axis of the objective lens 106a of the optical pickup 106 is faced to cross at a right angle with the information recording surface of the optical disk, the other end of the guide shaft 104 is moved in a direction H1 substantially crossing at a right angle with the surface of the chassis 101 and each of both ends of the guide shaft 105 is moved in the directions H2, H3 to adjust the guide shafts 104, 105 to be inclined against the surface of the chassis 101. A method for adjusting the guide shafts 104, 105 will be described later.

A nut member 114 is integrally fixed to the optical pickup 106 at one end of the bent pieces 106c, 106d of the pickup 106, and a nut part 114a of the nut member 114 is resiliently biased; and engaged with a valley of thread at a lead screw 115 which is substantially in parallel with the guide shaft 104 and rotatably arranged. In turn, a spur gear 116 is coaxially fixed to an end part of the lead screw 115 opposite to the turntable 102 in such a way that the spur gear is integrally rotated with the lead screw, and a spur gear 117 engaged with the spur gear 116 is fixed to a rotating shaft of a feeder motor 118. Then, this feeder motor 118 is rotationally driven to cause the lead screw 115 to be rotated under a gear ratio determined by the spur gear 116 and the spur gear 117, and then the optical pickup 106 having the nut member 114 fixed thereto is fed in a radial direction of the optical disk.

In addition, the optical disk is installed on the disk mounting surface 102a of the turntable 102, rotated by the spindle motor 103, a laser beam radiated from the objective lens 106a of the optical pickup 106 is condensed at the information recording surface of the optical disk, the return beam reflected from the information recording surface in response to information is received within the optical pickup 106 through the objective lens 106a again, thereby it is possible to read information in the information recording surface of the optical disk or record information onto the information recording surface. Further, the optical pickup, 106 performs a controlled motion in accordance with the information recording surface of the optical disk by the feeder motor 118 along the longitudinal directions of the guide shafts 104, 105.

Figure 7:
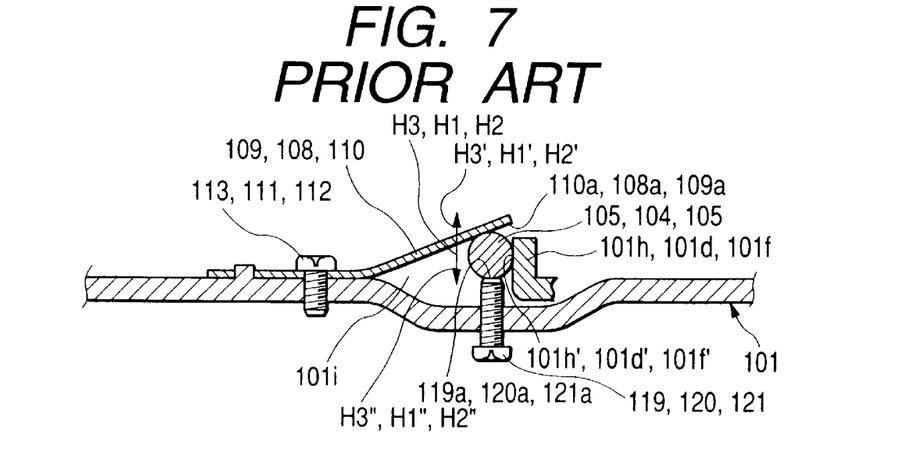
FIG. 7 shows the prior art optical disk device and is a sectional view taken along line 7—7 in FIG. 6.

Referring now to FIG. 7, a method for adjusting an inclination of each of the guide shafts 104, 105 will be described. FIG. 7 shows a sectional view taken along line 7—7 of FIG. 6.

As shown in this figure, the chassis 101 is formed with a downward protruded indentation 101i at the position of the other end of the guide shaft 105 biased by the leaf spring 110. Then, an adjustment screw 119 is rotatably arranged below an abutment surface of the leaf spring 110 against the guide shaft 105 and at the central part of the indentation 101i in such a way that it may be protruded from below the chassis 101 in an upward direction. Then, the other end of the guide shaft 105 is mounted on the extremity end surface 119a of the adjustment screw 119 arranged at a predetermined height and a pressing surface 110a of the leaf spring 110 pushes against the surface of the guide shaft 105 in a slant direction under a state in which the right side of the guide shaft 105 as viewed in the figure is abutted against an abutting surface 101h' of the position setting piece 101h (refer to FIG. 6), thereby the other end of the guide shaft 105 is resiliently biased by the screw extremity end surface 119a and the abutting surface 101h' and supported there.

With such an arrangement as above, the adjustment screw 119 is rotated to cause the other end of the guide shaft 105 to be moved in a direction H3 as shown in the figure, i.e. if the adjustment screw 119 is rotated in a clockwise direction, the other end of the guide shaft 105 can be adjusted in an upward, direction H3' and if the adjustment screw 119 is rotated in a counter-clockwise direction, the other end of the guide shaft 105 can be adjusted in a downward direction H3'.

The constitution shown in FIG. 7 is similarly applied in the case that other leaf springs 108, 109 are arranged. It is assumed that each of the adjustment screws arranged at the positions of the leaf springs 108, 109 is denoted by reference numerals 120, 121, respectively. With such an arrangement as above, an attitude of the optical pickup 106 can be changed by a method wherein an inclination of each of the guide shafts 104, 105 is changed by rotating the adjustment screws 119, 120 and 121. For example, referring now to FIG. 6, the adjustment screws 119, 121 (placed at positions of the leaf springs 110, 109, respectively) are rotated in the same direction by the same angle to cause each of both ends of the guide shaft 105 to be moved in the same direction by the same distance in the directions H3', H2' (upward direction), or the directions H3", H2" (downward direction), resulting in that the cutout groove 106h of the optical pickup 106 engaged with the guide shaft 105 is similarly moved upward or downward by the same distance and accordingly an angle of the optical axis of the objective lens 106a of the optical pickup 106 in respect to a direction crossing at a right angle with the radial direction of the optical disk (a tangential-direction) can be changed.

In addition, the adjustment screws 119, 120 (placed at the positions of the leaf springs 110, 108) are rotated in the same direction by the same angle to cause the other end of each of the guide shafts 104, 105 opposite to the turntable 102 to be moved in the directions H3', H1' (upward direction) or the directions H3", H1" (downward direction) in the same orientation by the same distance, resulting in that the entire optical pickup 106 engaged with the guide shafts 104, 105 is inclined, thereby an angle of the optical axis of the objective lens 106a in regard to the radial direction of the optical disk can be changed.

In the prior art, when the optical axis of the objective lens 106a is adjusted by the adjustment screws 119, 120 and 121 in regard to the aforesaid guide shafts 104, 105, it was necessary to align in advance a neutral position of each of the adjustment screws 119, 120, 121 with an initial position of each of the adjustment screws 119, 120, 121, i.e. a position where the axis of each of the guide shafts 104, 105 becomes in parallel with the disk mounting surface 102a of the turntable 102.

In the prior art optical disk device 100, the sheet metal machined by a press machining operation was used due to the fact that the sheet metal could be less-expensive and its rigidity was high, although a method in which the height of each of the adjustment screws 119, 120 and 121 is aligned with the neutral position in reference to the plane of chassis 101 could not attain a machining accuracy of the sheet metal, so that it could not provide an accuracy for the fixing plane of the spindle motor 103 having the turntable 102 shown in FIG. 6 fixed thereto and a degree of parallel state between an axis of each of the guide shafts 104, 105 and the disk mounting surface 102a of the turntable 102 having the optical disk mounted thereon was out of the desired value.

In view of the foregoing, in the prior art, an alignment of neutral position of each of the adjustment screws 119, 120 and 121 was carried out in reference to the disk mounting surface 102a of the turntable 102. As its method, at first, a reflecting plate such as a mirror or the like was mounted on the disk mounting surface 102a, laser beams produced from a laser length measuring unit were struck against the different three points on the reflecting surface to measure a distance and generate a reference plane. Then, the laser beam crossing at a right angle with the aforesaid reference plane was incident on the upper surface of the guide shaft 104 shown in FIG. 6, the other end of the guide shaft 104 was rotated in the direction of the arrow H1 by the adjustment screw 120 while an inclination of the reflected beam was being observed, it was adjusted to cause the reflected beam to be substantially coincided with the incident beam and then the neutral position of the adjustment screw 120 was aligned to attain a degree of parallel between the axis of the guide shaft 104 and the disk mounting surface 102a. Similarly, also as to the guide shaft 105, its height and the height of axis of the guide shaft 104 were aligned to each other, and at the same time the neutral positions of the adjustment screws 119, 121 were aligned to attain a degree of parallel.

However, in the case of the prior art optical disk device 100, when the neutral position of each of the adjustment screws 119, 120 and 121 was aligned to each other, the reference plane with the disk mounting surface 102a of the turntable 102 had to be set by calculation for every one unit of the optical disk device, resulting in that its workability was deteriorated.

In addition, although an optical measuring system using a laser beam to improve an accuracy of measurement was employed to perform the aforesaid measurement of the reference plane and the neutral position alignment of each of the adjustment screws 119, 120 and 121, there occurred a problem that a stage of neutral position alignment not only became complex, but also application of expensive measuring unit caused its facility expenditure to be increased and a cost of the optical disk device per unit was also increased.

SUMMARY OF THE INVENTION

It is an object of the present invention to provide an optical disk device in which a neutral position alignment for each of the adjustment screws can be easily carried out and in a high accuracy manner without increasing its cost while its workability is being improved.

As the first solving means for overcoming the aforesaid problem, the present invention is characterized in that a spindle motor on which a turntable having a disk mounting surface for use in mounting an optical disk is rotatably attached, an optical pickup for use in recording or reproducing information onto or from the optical disk, guide shafts for guiding the optical pickup in a radial direction of the optical disk, supporting members for supporting both ends of the guide shafts, and adjustment means having a mounting surface for mounting both ends of the guide shafts and for moving the mounting surface to move at least one end of each of the guide shafts in a direction substantially crossing at a right angle with the surface of a chassis are arranged on the chassis formed by a sheet metal, and the chassis is provided with resin fixing members having a fixing surface to attach and fix the spindle motor and resin reference members having a reference plane in parallel with the fixing surface.

Further, as the second solving means, the reference members are arranged at three locations at outer edge part surrounding the central part of the chassis.

Further, as the third solving means, the fixing members are arranged at three locations in the chassis.

Further, as the fourth solving means, the fixing members and the reference members are molded simultaneously by one molding die.

Further, as the fifth solving means, the fixing members and the reference members are formed at the chassis by an outsert molding.

BRIEF DESCRIPTION OF THE DRAWINGS

FIGS. 2A and 2B show the optical disk device of the preferred embodiment of the present invention, wherein

FIGS. 3A and 3B show the optical disk device of the preferred embodiment of the present invention, wherein

FIGS. 4A and 4B show the optical disk device of the preferred embodiment of the present invention, wherein

DETAILED DESCRIPTION OF THE PREFERRED EMBODIMENT

Referring now to FIGS. 1 to 5, the optical disk device of the preferred embodiment of the present invention will be described as follows.

Figure 1A:
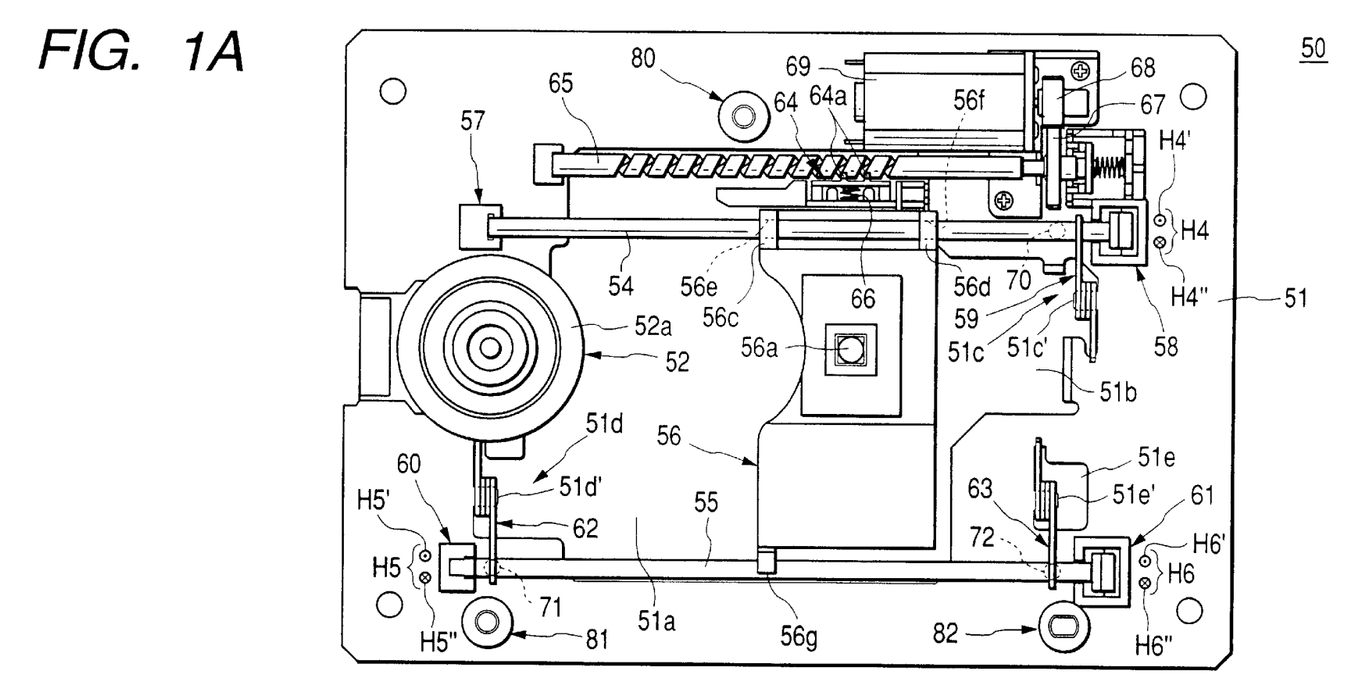
FIG. 1A is a top plan view for showing an optical disk device of the preferred embodiment of the present invention.
Figure 1B:
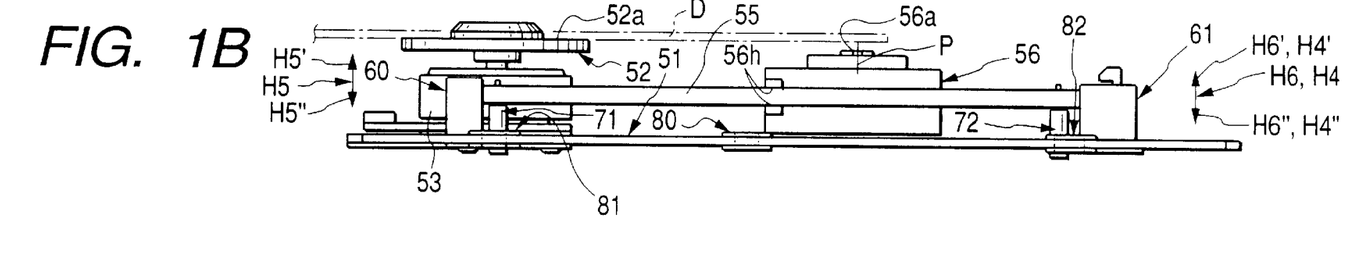
FIG. 1B is a side elevational view of FIG. 1A.

FIGS. 1A and 1B are a top plan view and a side elevational view for showing an optical disk device 50 to illustrate the preferred embodiment of the present invention. The optical disk device 50 is mainly comprised of a chassis 51 of rectangular shape formed by a sheet metal; a spindle motor 53 arranged on the chassis 51 and having a turntable 52 coaxially and rotatably attached thereto; guide shafts 54, 55 arranged in parallel to each other; an optical pickup 56 of substantial rectangular outer shape having an objective lens 56 arranged between the guide shafts 54, 55 and having a partial arcuate indentation part; and a feeder mechanism to be described later for feeding the optical pickup 56 in a longitudinal direction of the guide shafts 54, 55.

Then, the constitution of the optical disk device 50 will be described in detail.

At first, the central part of the chassis 51 is formed with a substantial rectangular hole 51a, and at one edge of the opposing edges of the hole 51a in a longitudinal direction of the chassis 51, the spindle motor 53 is attached and fixed on the surface of the chassis 51. Then, at the central part of the other edge of the hole 51a opposite to the spindle motor 53 is formed a cut out and formed rectangular-shaped hole 51b. The guide shafts 54, 55 are arranged at each of both lateral directions of the hole 51a in the chassis 51 in such a way that they may be in parallel with the longitudinal direction of the chassis 51. One end of the guide shaft 54 at the turntable 2 (hereinafter merely called as one end of the guide shaft 54) is positioned in a longitudinal direction and a diametric direction by the first resin supporting member 57 formed by an outsert molding at the surface of the chassis 51. In addition, the other end of the guide shaft 54 opposite to the turntable 52 (hereinafter merely called as the other end of the guide shaft 54) can be moved only in a direction crossing at a right angle with the surface of the chassis 51 (hereinafter called as a direction of height) by the second resin supporting member 58 similarly formed, and at the same time the other end is resiliently biased by a helical coil spring 59 toward the surface of the chassis 51 and supported there. In turn, both ends of the guide shaft 55 can also be moved similarly only in a direction of height by each of the third resin supporting member 60 and the fourth resin supporting member 61, and at the same time, they are biased resiliently toward the surface of the chassis 51 by the helical coil springs 62, 63 and supported there.

In addition, the guide shaft 54 is passed through the round holes 56e, 56f formed at each of the supporting pieces 56c, 56d arranged at one end of the optical pickup 56 at the side of the guide shaft 54, and a cutout groove 56h formed at the supporting piece 56g arranged at the other end opposite to the round holes 56e, 56f is slidably supported at the guide shaft 55, thereby the optical pickup 56 is movably guided in a longitudinal direction (the radial direction of the optical disk D) of the guide shafts 54, 55.

Further, the other end of the guide shaft 54 is moved in a direction H4 crossing at a right angle with the surface of the chassis 51 and each of both ends of the guide shaft 55 is moved in the directions H5, H6 to cause each of the guide shafts 54, 55 to be adjusted to be inclined against the surface of the chassis 51 in such a way that the optical axis P of the objective lens 56a of the optical pickup 56 may face against the information recording surface of the optical disk D in a right angle crossing direction, thereby the attitude of the optical pickup 56 can be changed. In addition, resin reference members 80, 81 and 82 having a reference plane acting as a reference during adjustment of the guide shafts 54, 55 are formed by an outsert molding. The method for adjusting the guide shafts 54, 55, and the reference members 80, 81 and 82 will be described later.

In addition, a nut member 64 is integrally fixed with the optical pickup 56 at one end of the optical pickup 56 at the sides of the supporting pieces 56c, 56d, and its nut part 64a is resiliently abutted against the valley of a lead screw 65 substantially in parallel with the guide shaft 54 and rotatably arranged around its axis by a compression spring 66. In turn, a spur gear 67 is coaxially attached at the end part of the lead screw 65 opposite to the turntable 52 so as to be integrally rotated with it, and further a spur gear 68 engaged with the spur gear 67 is fixed to the rotating shaft of a feeder motor 69. Then, this feeder motor 69 is rotationally driven to cause the lead screw 65 to be rotated under the most suitable gear ratio determined by the spur gear 67 and the spur gear 68, and the optical pickup 56 having the nut member 64 fixed thereto is fed to a radial direction of the optical disk D.

Further, as shown in FIG. 1B, the optical disk D is mounted on the disk mounting surface 52a of the turntable 52, rotated by the spindle motor 53, the laser beam radiated from the objective lens 56a of the optical pickup 56 is concentrated at the information recording surface of the optical disk D, the return beam reflected from the information recording surface in response to information is received within the optical pickup 56 through the objective lens 56a again, thereby it is possible to read information at the information recording surface of the optical disk D or record information onto the information recording surface. In addition, the optical pickup 56 performs a controlled motion by the feeder motor 69 along the longitudinal direction of the guide shafts 54, 55.

Figure 2A:
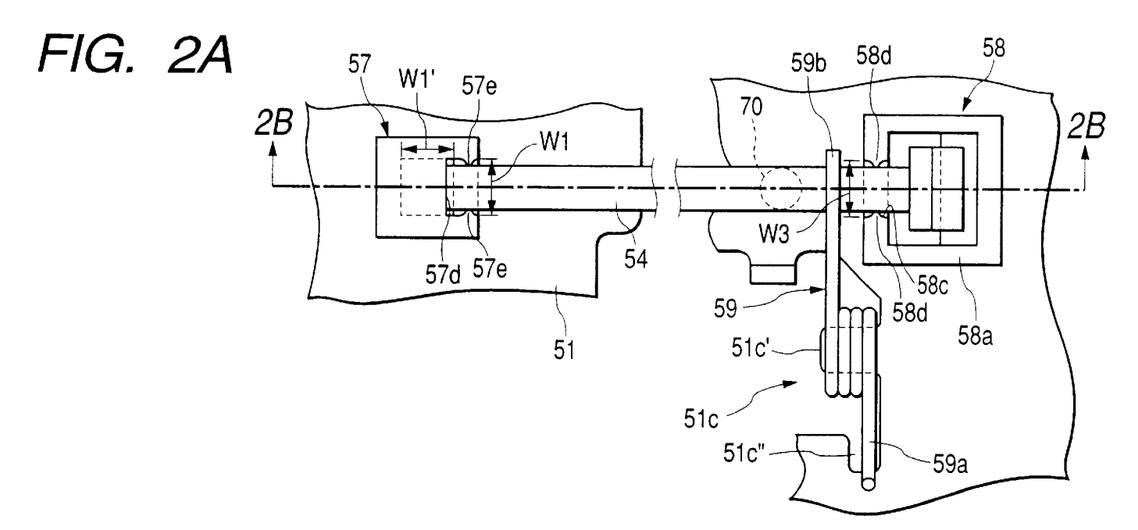
FIG. 2A is a partial enlarged top plan view for showing the first and second supporting members 57, 58 in FIG. 1A.

Then, referring to FIGS. 2A and 2B, assembled state and adjusting method for the first and second supporting members 57, 58 and the guide shaft 54 will be described as follows. FIG. 2A is a partial enlarged top plan view for the first and second supporting members 57, 58 in FIG. 1 and FIG. 2B is a sectional view taken along line 2B—2B in FIG. 2A.

Figure 2B:
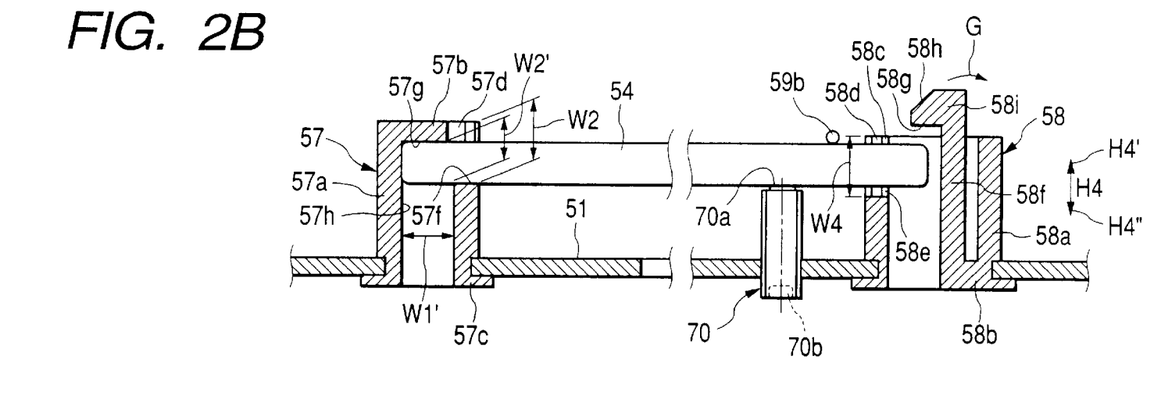
FIG. 2B is a sectional view taken along line 2B—2B in FIG. 2A.

At first, as shown in FIGS. 2A and 2B, the first supporting member 57 is comprised of a rectangular column-like barrel 57a having a hollow part with a rectangular hole section including two sides of W1, W1' vertically arranged above (the side at the turntable 52, refer to FIG. 1) in a height direction on the surface of the chassis 51, a top plate 57b, and a holding part 57c formed by an outsert molding at the lower surface of the chassis 51 so as to be connected with the barrel 57a to hold the chassis 51 for fixing the barrel 57a. The aforesaid W1 is a direction in parallel with the surface of the chassis 51 and crossing at a right angle with an axial direction of the guide shaft 54 and has a width slightly wider than a diameter of the guide shaft 54. In addition, the side of the top plate 57b facing to the second supporting member 58 is formed with a cutout groove 57d having a width W1. In addition, from the upper surface at the side wall of the barrel 57a facing the second supporting member 58 is formed a cutout groove having a width W1 to be connected to the cutout groove 57d formed in the top plate 57b and to have a length of W2 in a height direction from the upper surface to a downward direction. Then, an opening W2' is formed between an inner wall surface 57g of the top plate 57b and a lower surface 57f of the cutout groove 57d having a length of W2. Further, both side walls of the cutout groove 57d in the direction of the width W1 are provided with each of protrusions 57e, 57e projected inwardly as shown in FIG. 2A, and a distance between the extremity ends of each of the protrusions 57e, 57e is formed to become approximately equal to a diameter of the guide shaft 54. Additionally, a distance in the direction of height of the opening W2' shown in FIG. 2B is formed to become approximately equal to a diameter of the guide shaft 54.

Then, as shown in FIGS. 2A, 2B, the second supporting member 58 is comprised of a rectangular column-like barrel part 58a having a rectangular hole-shaped hollow part vertically installed on the surface of the chassis 51, and a holding part 58b formed to be connected to the barrel part 58a at the lower surface of the chassis 51. Further, a side wall of the barrel part 58a facing to the first supporting member 57 is formed with a cutout groove 58c having a width W3 slightly wider than a diameter of the guide shaft 54 in a range of a length W4 from the upper surface of the barrel part 58a to a downward part in the height direction. Further, as shown in FIG. 2A, both side walls of the cutout groove 58c in a direction of a width W3 are provided with each of protrusions 58d, 58d projected inwardly, and a distance between the extremity ends of each of the protrusions 58d, 58d is formed to become approximately equal to a diameter of the guide shaft 54. A length W4 of the cutout groove 58c formed at the barrel part 58a in the direction of height is formed to become larger than the diameter of the guide shaft 54. Further, a supporting piece 58f is formed to pass through the hollow part of the barrel part 58a upwardly from the holding part 58b and to project from the upper surface of the barrel part 58a, and the extremity end of the supporting piece 58f is provided with a claw-like piece 58i having a restricting surface 58g and a slant surface 58h. The claw-like piece 58i is movably supported resiliently by a supporting piece 58f in a direction of an arrow G in FIG. 2B.

In addition, as shown in FIGS. 2A and 2B, at the position of the second supporting member 58 adjacent to the first supporting member 57 is arranged an adjustment means, i.e. an adjustment screw 70 rotatably passed from the lower surface of the chassis 51 upwardly. Then, the mounting surface of the adjustment screw 70, i.e. the extremity end surface 70a is arranged to become higher than the height of the lower surface 58e of the cutout groove 58c formed at the second supporting member 58 from the lower surface of the chassis 51 only by a predetermined distance. The lower surface of the adjustment screw 70 is formed with a hexagonal hole 70b and the adjustment screw 70 can be rotated by a tool such as a hexagonal wrench or the like.

Further, as shown in FIGS. 1A and 2A, an opening 51c cut out to be displaced at the guide shaft 54 is formed at the edge of the hole 51b formed at the chassis 51 opposite to the turntable 52. In addition, there is provided a projecting piece 51c' protruded substantially in parallel with the guide shaft 54 from the central part of the cutout bottom section of the opening 51c and a helical coil spring 59 can be fitted to the projecting piece 51c'. Then, as shown in FIG. 2A, one end 59a of the helical coil spring 59 is engaged with an engaging part 51c" cut out and formed at the opening 51c and the other end 59b is arranged to be biased toward the surface of the chassis 51.

In the case that the guide shaft 54 is assembled into the first and second supporting members 57, 58 described above, at first one end of the guide shaft 54 is inserted into the opening W2' from a slant upper part at the first supporting member 57 shown in FIG. 2B and abutted against the inner wall surface 57h of the barrel part 57a. Then, the other end of the guide shaft 54 is abutted against the slant surface 58h formed at the claw-like piece 58i from above the second supporting member 58, and the claw-like piece 58i is pushed to be resiliently displaced in a direction of an arrow G shown in the figure and inserted into the cutout groove 58c formed at the barrel part 57a. Under this state, one end of the guide shaft 54 is restricted in its motion in a diametric direction with the first, supporting member 57. Further, the other end is restricted in its motion in a direction in parallel with the surface of the chassis 51 at the second supporting member 58 and at the same time it is mounted on the upper end surface 70a of the adjustment screw 70.

Further, motion of the guide shaft 54 at its both ends is restricted between the inner wall surface 57h of the barrel part 57a of the first supporting member 57 and the supporting piece 58f arranged at the second supporting member 58, respectively, and then a removal of the guide shaft in its longitudinal direction is prevented. Additionally, the other end of the guide shaft 54 is resiliently pushed against the upper end surface 70a of the adjustment screw 70 by the other end 59b of the helical coil spring 59 at its upper part and supported there.

Then, referring now to FIG. 2B, a method for adjusting inclination of the guide shaft 54 will be described as follows.

In the case of the constitution of the first and second supporting members 57, 58 as described above, the adjustment screw 70 is turned at the second supporting member 58 to cause the other end of the guide shaft 54 to be moved in the direction of H4 in the figure between a restricting surface 58g arranged at the claw-like piece 58i and a lower surface 58e of a cutout groove 58c of the barrel part 58a, i.e. if it is turned in a clockwise direction, the aforesaid other end is moved in the upward direction H4' and if it is turned in a counter-clockwise direction, the other end is moved in a downward direction H4", resulting in that it can be adjusted in its inclination around a substantial fulcrum point of the position of the opening W2' of the first supporting member 57. Accordingly, it becomes possible to change an inclination of the guide shaft 54 in respect to the surface of the chassis 51.

Figure 3A:
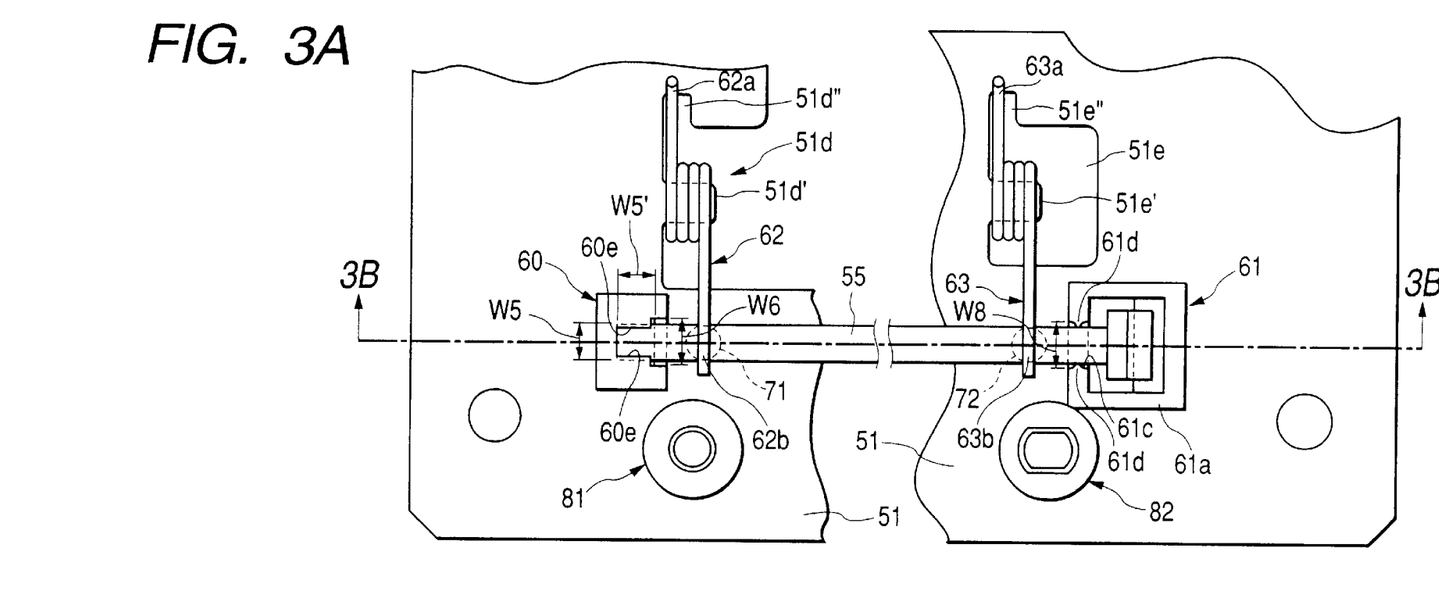
FIG. 3A is a partial enlarged top plan view for showing the third and fourth supporting members 60, 61 in FIG. 1A.
Figure 3B:
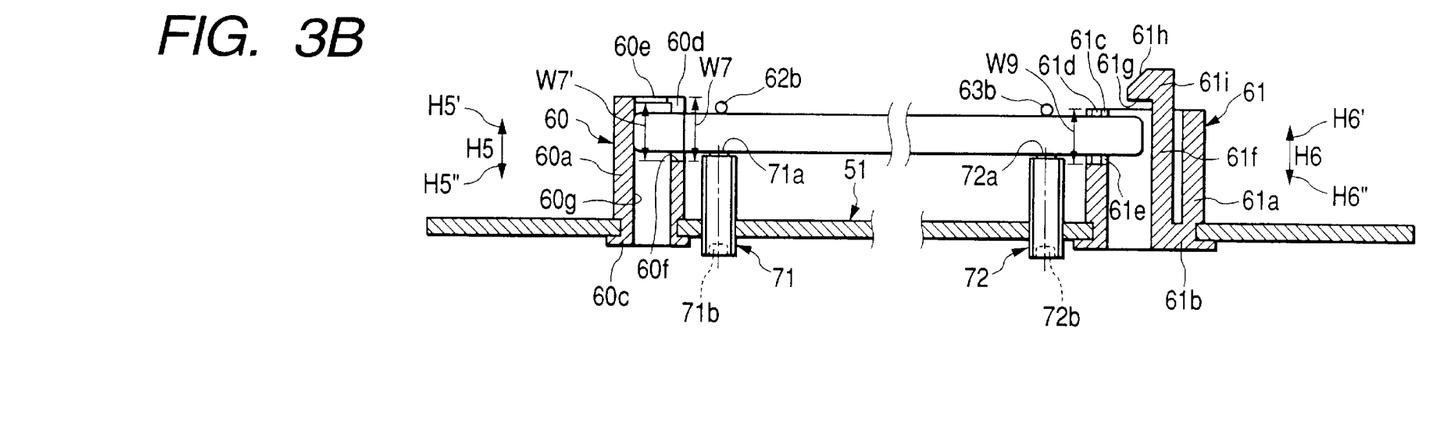
FIG. 3B is a sectional view taken along line 3B—3B in FIG. 3A.

Then, referring now to FIGS. 3A and 3B, an assembled state and method for adjusting the third and fourth supporting members 60, 61 and the guide shaft 55 will be described. FIG. 3A is a partial enlarged top plan view for showing the third and fourth supporting members 60, 61 in FIG. 1A. FIG. 3B is a sectional view taken along line 3B—3B in FIG. 3A.

At first, as shown in FIGS. 3A and 3B, the third supporting member 60 is comprised of a rectangular column-like barrel part 60a having a hollow part of rectangular hole section with two sides of W5, W5' vertically installed above (the side of the turntable 52, refer to FIG. 1) in a direction crossing at a right angle with the surface of the chassis 51 (the height direction) and a holding part 60c formed at the lower surface of the chassis 51 to be connected to the barrel part 60a in such a way that the chassis 51 is held to fix the barrel part 60a. The aforesaid W5 is a direction in parallel with the surface of the chassis 51 and crossing at a right angle with an axial direction of the guide shaft 55, where it has a width approximately equal to a diameter of the guide shaft 55. In addition, at the side wall of the third supporting member 60 at the side of the fourth supporting member 61 is formed a cutout groove 60d having a width W6 slightly wider than the width W5 over the length W7 from the upper surface to downward direction. Further, the length W7 is formed in a predetermined length to be larger than the diameter of the guide shaft 54. In addition, restricting pieces 60e, 60e projected into the inner hollow part are formed from the upper surfaces of both side walls in the direction of the width W5. A distance between the extremity ends of each of the restricting pieces 60e, 60e is formed to be smaller than a diameter of the guide shaft 55. An opening W7' is formed between the protrusions 60e, 60e and the lower surface 60f of the cutout groove 60d.

Additionally, at the position of the third supporting member 60 adjacent to the fourth supporting member 61 is arranged an adjustment means i.e. the adjustment screw 71 rotatably inserted from the lower surface of the chassis 51 to an upward direction. Then, the mounting surface of the adjustment screw 70, i.e. the extremity end surface 70a is arranged to become higher than the height of the lower surface 60f of the cutout groove 60d in the third supporting member 60 from the surface of the chassis 51 by a predetermined distance. In addition, the lower end surface of the adjustment screw 71 is formed with a hexagonal hole 70b and the adjustment screw 71 can be turned by a tool such as a hexagonal wrench and the like.

Further, as shown in FIGS. 1A and 3A, the edge part of the hole 51a formed at the chassis 51 in the side of the turntable 52 is formed with an opening 51d cut out adjacent to the guide shaft 55. In addition, at the central part of the edge of the opening 51d in a direction crossing at a right angle with the guide shaft 55 is arranged a projecting piece 51d' projected substantially in parallel with the guide shaft 55, and a helical coil spring 62 can be fitted to the projecting piece 51d'. Then, one end 62a of the helical coil spring 62 is engaged with an engaging part 51d" cut out and formed at the opening 51d, the other end 62b is arranged to be biased toward the surface of the chassis 51.

Then, the fourth supporting member 61 has substantially the similar constitution to that of the aforesaid second supporting member 58 and as shown in FIGS. 3A and 3B, the fourth supporting member is comprised of a rectangular column-like barrel part 61a having a rectangular hole-shaped hollow part and a holding part 61b connected to and formed with the barrel part 61a. In addition, the barrel part 61a is formed with a cutout groove 61c having a width W8 slightly wider than a diameter of the guide shaft 55 which is extended over a length W9 from the upper surface of the barrel part 61a to a downward direction. Further, as shown in FIG. 3A, the protrusions 61d, 61d are protruded from both side walls of the cutout groove 61c in the direction of the width W8, wherein a distance between the extremity ends of each of the protrusions 61d, 61d is formed to be approximately equal to a diameter of the guide shaft 55. Further, the length W9 of the cutout groove 61c formed at the barrel part 61a shown in FIG. 3B is formed to be larger than a diameter of the guide shaft 55. In addition, a supporting piece. 61f is vertically installed from the holding part 61b and the extremity end of the supporting piece 61f is provided with a claw-like piece 61i having a restricting surface 61g and a slant surface 61h.

Further, as shown in FIGS. 3A and 3B, an adjustment means, i.e. an adjustment screw 72 is arranged at a position adjacent to the third supporting member 60 of the fourth supporting member 61. Then, the mounting surface of the adjustment screw 72, i.e. the extremity end surface 72a is arranged to become higher than the height of the lower surface 61e of the cutout groove 61c formed at the fourth supporting member 61 from the surface of the chassis 51 by a predetermined distance. Further, the lower end surface of the adjustment screw 72 is formed with a hexagonal hole 72b.

Further, as shown in FIGS. 1A and 3A, at the position adjacent to the fourth supporting member 61 and the guide shaft 54 in the chassis 51 is formed a rectangular-shaped opening 51e. In addition, a protrusion piece 51e' projected substantially in parallel with the guide shaft 55 is provided at the central part of one edge in a direction crossing at a right angle with an axial direction of the guide shaft 55 of the opening 51e, and a helical coil spring 63 can be fitted to the protrusion piece 51e'. Then, one end 63a of the helical coil spring 63 is engaged with the engaging part 51e" formed at the opening 51e, the other end 63b is arranged to be biased against the surface of the chassis 51.

In the case that the guide shaft 55 is assembled to the third and fourth supporting members 60, 61, at first, as shown in FIG. 3B, one end of the guide shaft 55 is inserted into the opening W7' and abutted against the inner wall surface 60g of the barrel part 60a. Then, the other end of the guide shaft 55 is pushed from above the fourth supporting member 61 to be abutted against the slant surface 61h formed at the claw-like piece 61i and inserted into the cutout groove 61c formed at the barrel part 61a. Under this state, as shown in FIG. 3B, one end of the guide shaft 55 is restricted in its motion in a diametric direction in parallel with the surface of the chassis 51 by the third supporting member 60 and at the same time it is mounted on the upper end surface 71a of the adjustment screw 71 and a clearance is formed between the lower surface 60f of the third supporting member 60 and the protrusions 60e, 60e. In addition, the other end of the guide shaft 55 is restricted in its motion in a diametric direction in parallel with the surface of the chassis 51 at the fourth supporting member 6, it is mounted on the upper end surface 72a of the adjustment screw 72 and a clearance is formed between the lower surface 61e of the fourth supporting member 61 and the restricting surface 61g. In addition, at the longitudinal direction of the guide shaft 55, both ends of it are restricted in their motion by restriction between the inner wall surface 60g at the barrel part 60a of the third supporting member 60 and the supporting piece 61f arranged at the fourth supporting member 61 so as to be prevented from being pulled out.

Both ends of the guide shaft 55 are set such that each of their upper portions is biased by the other ends 62b, 63b of the helical coil springs 62, 63, resiliently pushed against the upper end surfaces 71a, 72a of each of the adjustment screws 71, 72 and supported there.

Then, referring now to FIG. 3B, a method for adjusting an inclination of the guide shaft 55 and the like will be described.

With such an arrangement of the third and fourth supporting members 60, 61, the adjustment screws 71, 72 are turned in the same direction only by the same angle at each of the third and fourth supporting members 60, 61 to cause each, of both ends of the guide shaft 55 to be moved in the same direction as that indicated by H5, H6 in the figure only by the equal distance, i.e. if the adjustment screws are turned in a clockwise direction, both ends of the guide shaft 55 are moved upwardly to H5', H6' by an equal distance and in turn if the adjustment screws are turned in a counter-clockwise direction, they are moved downwardly to H5", H6" only by an equal distance, resulting in that the height of the guide shaft 55 against the surface of the chassis 51 can be changed.

Further, the adjustment screw 72 is turned only at the fourth supporting member 61, for example, the other end of the guide shaft 55 is moved in a direction H6 in the figure, i.e. if it is turned in a clockwise direction, the other end of the guide shaft 55 is moved upwardly in a direction H6' in the figure, and in turn if it is turned in a counter-clockwise direction, it is moved downwardly in a direction H6" and its inclination can be adjusted around a substantial fulcrum point of the position of the opening W7' of the third supporting member 60. Accordingly, the inclination of the guide shaft 55 in respect to the surface of the chassis 51 can be changed.

With such an arrangement as above, the attitude of the optical pickup 56 can be changed by changing either inclination or height of the guide shafts 54, 55 upon rotation of the adjustment screws 70, 71 and 72. Referring to FIGS. 1A and 1B, for example, the adjustment screws 71, 72 are turned in the same direction only by the same angle, and each of both ends of the guide shaft 55 is moved in the directions H5', H6' (upwardly) or moved in the same direction only by the same distance in H5", H6" (downwardly) to cause the guide shaft 55 to be moved in parallel with the surface of the chassis 51, the cutout groove 56h of the optical pickup 56 engaged with the guide shaft 55 also to be moved upwardly or downwardly by the same distance, and accordingly the optical axis P of the objective lens 56a of the optical pickup 56 can be changed in its angle in respect to the direction crossing at a right angle with the radial direction of the optical disk D (tangential direction).

Further, if adjustment screws 70 and 72 are turned in the same direction by the same angle, for example, to cause the other end of each of the guide shafts 54, 55 to be moved in the same direction by the same amount in the directions H4', H6' (upwardly) or in the directions H4", H6" (downwardly), resulting in that the entire pickup 56 engaged with the guide shafts 54, 55 is inclined, thereby the angle of the optical axis P of the objective lens 56a can be changed in respect to the radial direction of the optical disk D (the radial direction)

Figures 4A, 4B:
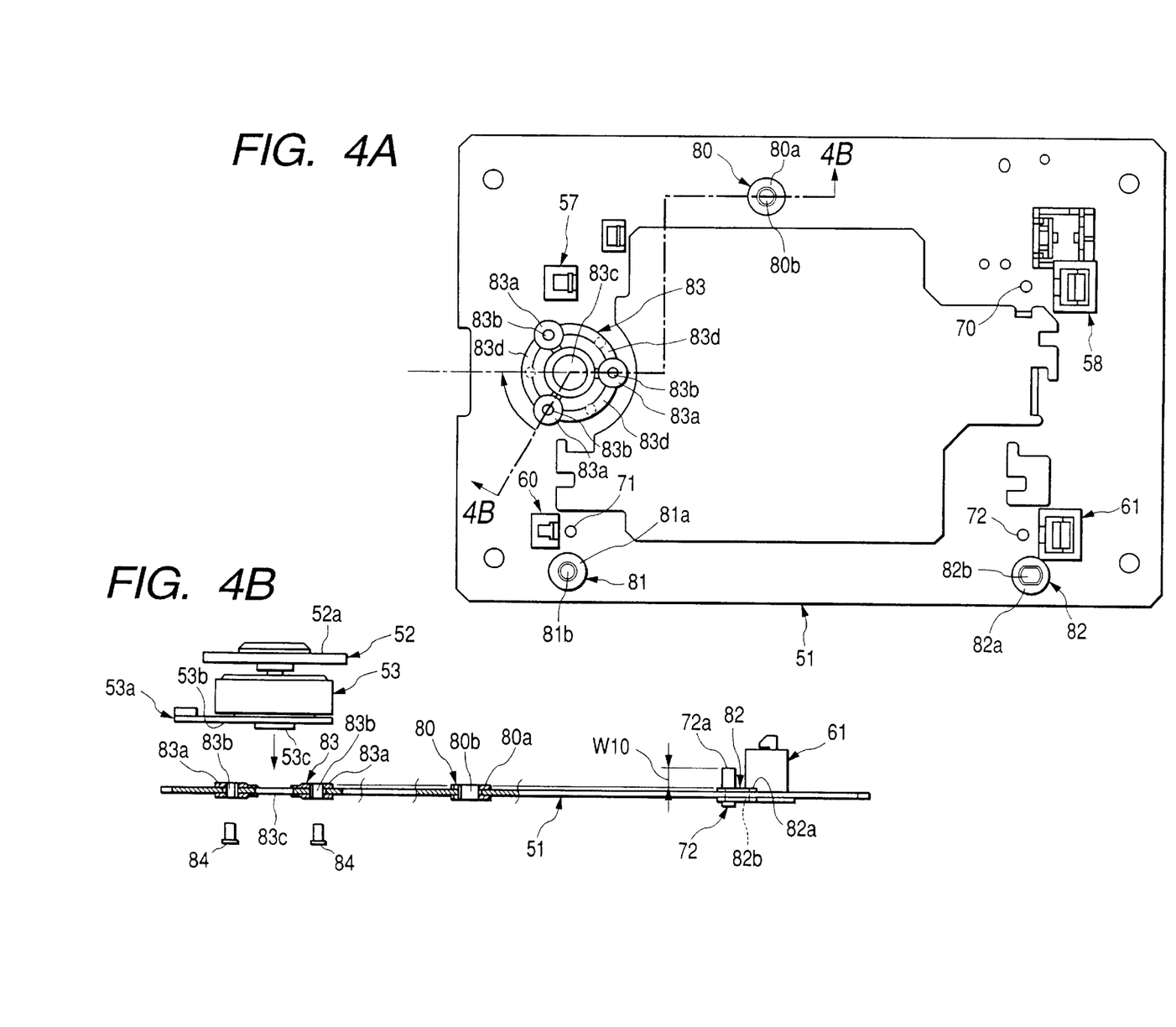
FIG. 4A is a top plan view for showing the chassis 51 to illustrate reference members 80, 81 and 82 and the fixing member 83.
FIG. 4b is a partial sectional side view of FIG. 4A.

Then, referring now to FIGS. 4A and 4B, the reference members 80, 81 and 82 and the fixing member 83 for attaching and fixing the spindle motor 53 will be described as follows. FIG. 4A is a top plan view for the chassis 51 to illustrate the reference members 80, 81 and 82 and the fixing member 83 and FIG. 4B is a partial sectional side elevational view for showing the same.

As shown in FIGS. 4A and 4B, the resin fixing member 83 for use in attaching and fixing the spindle motor 53 is formed by an outsert molding operation. Then, the fixing member 83 has three circular fixing surfaces 83a, 83a, 83a for mounting the base plate 53a of the spindle motor 53; a through hole 83c to which a protrusion 53c projected from the lower surface 53b of the base plate 53a of the spindle motor 53 is fitted to cause the position of the spindle motor 53 to be set; screw setting holes 83b, 83b, 83b formed substantially at the central portions of the fixing surfaces 83a, 83a, 83a; and reinforcing portions 83d, 83d, 83d for use in reinforcing the fixing member 83.

As shown in FIG. 4B, the spindle motor 53 is attached to and fixed to the fixing member 83 by the screws 84, 84, 84 (only two screws are illustrated in the figure) through the screw setting holes 83b, 83b, 83b formed at the fixing surfaces 83a, 83a, 83a.

In turn, as shown in FIG. 4A, the chassis 51 is formed with the reference members 80, 81, 82 at three outer edges enclosing the central part of the chassis 51. The reference member 80 has a reference plane 80a and a through hole 80b. Similarly, each of the reference members 81, 82 has a reference plane 81a and a through hole 81b, and a reference plane 82a and a longitudinal through hole 82b.

The fixing member 83 and the reference members 80, 81, 82 are outsert molded at the chassis 51 by one molding die, the fixing planes 83a, 83a, 83a of the fixing member 83 and each of the reference planes 80a, 81a, 82a of the reference members 80, 81, 82 are formed by the molding die machined into the same plane. Accordingly, the chassis 51 is formed with the fixing surfaces 83a, 83a, 83a having a superior degree of flatness and each of the reference planes 80a, 81a, 82a of the reference members 80, 81, 82, respectively, without having any relation with a warp state of the chassis 51.

Then, as shown in FIG. 4B, the neutral height of the extremity end surfaces 70a, 71a, 72a (refer to FIGS. 2B and 3B) of each of the adjustment screws 70,71, 72 where the guide shafts 54, 55 are mounted and axes of the guide shafts 54, 55 become in parallel with the disk mounting surface 52a of the turntable 52 is designed such that it may occupy a predetermined height (W10) from the reference planes 80a, 81a, 82a of the aforesaid reference members 80, 81, 82.

Figure 5:
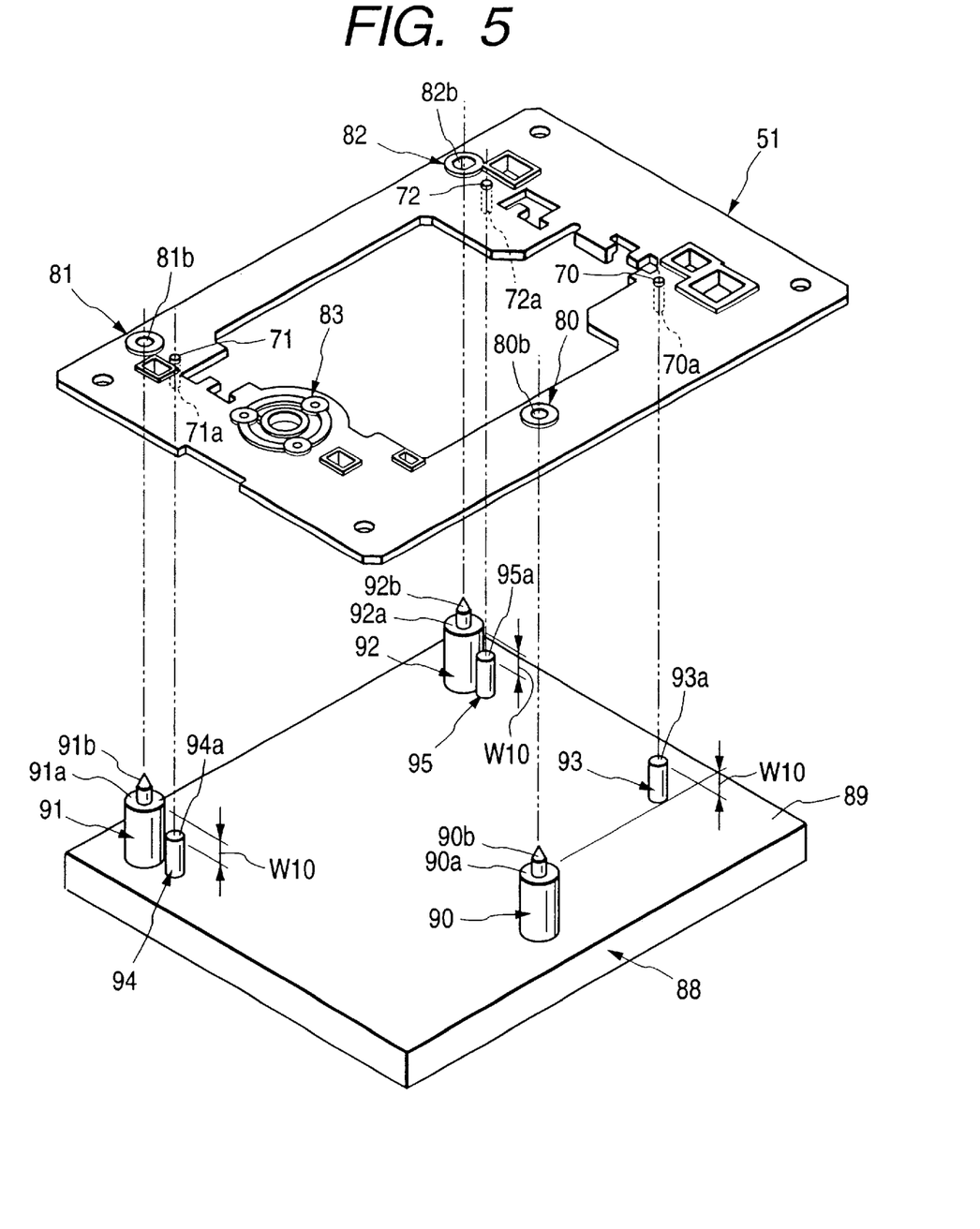
FIG. 5 is an illustrative view for showing the optical disk device of the preferred embodiment of the present invention to illustrate a state in which a height of each of the extremity end surfaces 70a, 71a and 72a of the adjustment screws 70, 71 and 72 is aligned with its neutral position.

Referring now to FIG. 5, there will be described a method for position aligning a neutral height of the extremity end surfaces 70a, 71a, 72a of each of the adjustment screws 70, 71, 72 rotatably attached to the chassis 51 from the reference planes 80a, 81a, 82a of each of the reference members 80, 81, 82, respectively.

FIG. 5 is an illustrative view for showing a state in which a height of each of the extremity end surfaces 70a, 71a, 72a of the adjustment screws 70, 71, 72 is set at its neutral position.

Reference numeral 88 in the figure denotes a jig for use in aligning a neutral position. In addition, the chassis 51 is installed in the jig 88 with the surface having the spindle motor 53 (refer to FIG. 4B) attached and fixed thereto being faced downward as viewed in the figure. The jig 88 is comprised of a rectangular plate base 89; column-like mounting bases 90, 91, 92 vertically installed from the upper surface of the base 89 in correspondence with each of the positions of the reference members 80, 81, 82 in the chassis 51; and column-like position setting bases 93, 94, 95 vertically installed from the upper surface of the base 89 in correspondence with the positions of the adjustment screws 70, 71, 72 fixed to the chassis 51.

In addition, each of the mounting bases 90, 91, 92 is comprised of the mounting surfaces 90a, 91a, 92a and the protrusions 90b, 91b, 92b formed to be protruded from the mounting surfaces 90a, 91a, 92a and to have extremity ends sharpened. Further, each of the mounting surfaces 90a, 91a, 92a is formed to have the same plane to each other. Then, each of the upper end surfaces 93a, 94a, 95a of the position setting bases 93, 94, 95 is formed to be lower than the mounting surfaces 90a, 91a, 92a only by W10 (refer to FIG. 4B).

Then, the through holes 80b, 81b, 82b of the reference members 80, 81, 82 formed at the chassis 51 are fitted to each of the protrusions 90b, 91b, 92b arranged at the mounting bases 90, 91, 92, thereby the reference planes 80a, 81a, 82a (refer to FIG. 4) of the reference members 80, 81, 82 are mounted on the mounting surfaces 90a, 91a, 92a of the mounting bases 90, 91, 92 and the chassis 51 is installed at the jig 88.

Under this state, the adjustment screws 70, 71, 72 are passed through the chassis 51 while being turned (the fixed state is indicated in FIG. 5) and the rotation is stopped at the time when each of the extremity end surfaces 70a, 71a, 72a is abutted against the upper end surfaces 93a, 94a, 95a of the position setting bases 93, 94, 95 of the jig 88, respectively. In this way, the neutral position setting of the extremity end surfaces 70a, 71a, 72a of each of the adjustment screws 70, 71, 72 from the reference planes 80a, 81a, 82a of the reference members 80, 81, 82 is completed.

As described above, in accordance with the preferred embodiment of the present invention, there are provided at the chassis 51, as shown in FIGS. 4A and 4B, the fixing member 83 having the fixing surfaces 83a, 83a, 83a for use in attaching and fixing the spindle motor 53 and the reference members 80, 81, 82 having each of the reference planes 80a, 81a, 82a becoming the same plane as the aforesaid fixing surfaces 83a, 83a, 83a, so that even if a certain warp is produced at the chassis 51, mere setting of neutral position of the adjustment screws 70, 71, 72 against the reference planes 80a, 81a, 82a enables a predetermined degree of parallel between the axes of the guide shafts 54, 55 and the disk mounting surface 52a of the turntable 52 to be assured simultaneously, it can be eliminated to attain the reference plane through measurement for every one unit of the optical disk device 1, resulting in that its workability can be improved.

Further, since the aforesaid reference planes 80a, 81a, 82a are arranged at three locations at the outer edge of the chassis 51 to enclose the central part of it, it is possible to perform a neutral position setting of the adjustment screws 70, 71, 72 in respect to the reference plane widely enclosing the chassis 51 comprised of planes including three reference planes 80a, 81a, 82a and further a step of neutral position setting can be carried out accurately. In addition, the device is installed in the jig under utilization of three reference planes 80a, 81a, 82a and the stage for setting a neutral position can be easily carried out. Further, as shown in FIG. 5, the neutral position setting jig is comprised of the base 89, mounting bases 90, 91, 92 vertically installed from the upper surface of the base 89, and the position setting bases 93, 94, 95 and simplified, wherein an expensive device such as a laser distance measuring unit is not required and the cost of the optical disk device is not increased.

Further, since the fixing members 83 are arranged at three locations in the chassis 51, the spindle motor 53 can be attached to and fixed to the fixing plane enclosing the three fixing surfaces 83a, 83a, 83a and the fixing accuracy can be improved.

In addition, since the fixing member 83 and the reference members 80, 81, 82 are simultaneously molded by one molding die, the fixing surfaces 83a, 83a, 83a of the fixing member 83 and the reference planes 80a, 81a, 82a of each of the reference members 80, 81, 82 can be molded by the molding die precisely machined to have the same plane and the neutral position setting can be carried out accurately.

Further, the fixing member 83 and the reference members 80, 81, 82 are integrally formed to the chassis 51 by an outsert molding, so that the fixing member 83 and the reference members 80, 81, 82 can be fixed to the chassis 51 in simultaneous with their molding operations and they can be formed without increasing cost.

Further, in the case of the present invention, although the fixing surfaces 83a, 83a, 83a of the fixing member 83 shown in FIG. 4 and the reference planes 80a, 81a, 82a of each of the reference members 80, 81, 82 are formed to become the same plane, although it may also be changed such that they may not be limited, but the height of the fixing surfaces 83a, 83a, 83a of the reference planes 80a, 81a, 82a may become a specified size.

As described above, in accordance with the present invention, there are arranged on a chassis formed by a sheet metal, a spindle motor in which a turntable having a disk mounting surface for use in mounting an optical disk is rotatably attached on, an optical pickup for use in recording or reproducing information onto or from the optical disk, guide shafts for guiding the optical pickup in a radial direction of the optical disk, supporting members for supporting both ends of the guide shafts, and adjustment means having a mounting surface for mounting both ends of the guide shafts and for moving the mounting surface to move at least one end of each of the guide shafts in a direction substantially crossing at a right angle with the surface of the chassis, and the chassis is provided with resin fixing members having a fixing surface to attach and fix the spindle motor and resin reference members having a reference plane in parallel with the fixing surface and having a specified height from the fixing surface, so that even if the warp state occurs at the chassis, mere setting of the neutral position of the mounting surface against the reference enables a predetermined degree of parallel between the guide shafts and the disk mounting surface of the turntable to be attained simultaneously, the reference planes may not be required through measurement for one unit of the optical disk, resulting in that the workability can be improved.

Further, since the reference members are arranged at three locations at the outer edge enclosing the central part of the chassis, it is possible to perform a neutral position alignment of the adjustment screws 70, 71, 72 against the reference plane widely enclosing the chassis comprised of plane including three reference surfaces and further the step for neutral position setting can be carried out accurately. Further, the device is installed at the jig under utilization of three reference surfaces to enable the stage of neutral position setting operation to be easily carried out. In addition, no expensive device is required for the jig for the neutral position setting, so that the cost of the optical disk device is not increased.

Further, the fixing members are arranged at three locations in the chassis, so that the spindle motor can be attached to and fixed to the fixing plane enclosing the three fixing surfaces and a fixing accuracy can be improved.

Further, the fixing members and the reference members are molded simultaneously by one molding die, so that irrespective of the fixing positions of the fixing members against the chassis, a height size between the fixing surface and the reference plane of each of the reference members can be accurately machined and a neutral position setting operation can be accurately carried out.

Further, the fixing members and the reference members are formed at the chassis by an outsert molding, so that the fixing members and the reference members can be fixed to the chassis in simultaneous with their forming and they can be formed without increasing the cost.

What is claimed is:

1. An optical disk device in which, a spindle motor on which a turntable having a disk mounting surface for use in mounting an optical disk is rotatably attached, an optical pickup for use in recording or reproducing information onto or from the optical disk, guide shafts for guiding the optical pickup in a radial direction of the optical disk, supporting members for supporting both ends of the guide shafts, and adjustment means having a mounting surface for mounting both ends of the guide shafts and for moving the mounting surface to move at least one end of each of the guide shafts in a direction substantially crossing at a right angle with the surface of a chassis are arranged on the chassis formed of a sheet metal, and the chassis is provided with resin fixing members having a fixing surface to attach and fix the spindle motor and resin reference members having a reference plane in parallel with the fixing surface.

2. An optical device according to claim 1, wherein the reference members are arranged at three locations at outer edge parts surrounding the central part of the chassis.

3. An optical device according to claim 1, wherein the fixing members are arranged at three locations in the chassis.

4. An optical device according to claim 1, wherein the fixing members and the reference members are molded simultaneously by one molding die.

5. An optical device according to claim 1, wherein the fixing members and the reference members are formed at the chassis by an outsert mold.

* * * * *